United States Patent [19]

Shu et al.

[11] Patent Number: 4,751,024

[45] Date of Patent: Jun. 14, 1988

[54] SPRAYABLE FIREPROOFING COMPOSITION

[75] Inventors: Larry S. Shu, Newton Highlands, Mass.; Walter R. Payment, Greenville, S.C.

[73] Assignee: W. R. Grace & Co., Cambridge, Mass.

[21] Appl. No.: 849,232

[22] Filed: Apr. 7, 1986

[51] Int. Cl.$^4$ .................. C09K 21/00; E04B 1/74; B27N 9/00; C04B 24/00

[52] U.S. Cl. .................. 252/601; 106/18.11; 106/90; 106/93; 106/97; 106/99; 106/109; 106/111; 106/114; 106/115; 252/602; 252/62; 428/402; 428/404; 428/407; 428/920; 428/921

[58] Field of Search .................. 252/601, 602, 606, 62; 106/15.05, 18.11, 18.12, 18.23, 18.34, 77, 78, 93, 89–90, 97–99, 109–111, 114, 115; 428/306, 309, 310, 537, 703, 540, 920.1, 407, 404, 402; 264/140; 241/21

[56] References Cited

U.S. PATENT DOCUMENTS

| | | | |
|---|---|---|---|
| 3,021,292 | 2/1962 | Thiessen | 250/2.5 |
| 3,257,338 | 6/1966 | Sefton | 260/2.5 |
| 3,272,765 | 12/1966 | Sefton | 260/2.5 |
| 3,338,848 | 8/1967 | Hamilton | 260/2.5 |
| 3,361,688 | 1/1968 | Bonitz | 260/2.5 |
| 3,627,211 | 12/1971 | Leach | 241/3 |
| 3,630,820 | 12/1971 | Leach | 264/115 |
| 3,686,068 | 8/1972 | Leach | 161/168 |
| 3,697,366 | 10/1972 | Harlock et al. | 161/159 |
| 3,719,513 | 3/1973 | Bragg | 106/114 |
| 3,764,357 | 10/1973 | Bowles | 106/90 |
| 3,839,059 | 10/1974 | Rothfelder | 106/115 |
| 3,883,359 | 5/1975 | Harvey | 106/64 |
| 4,040,855 | 8/1977 | Rady-Pentek et al. | 106/90 |
| 4,100,242 | 7/1978 | Leach | 264/115 |
| 4,223,066 | 9/1980 | Boyle | 428/306 |
| 4,225,358 | 9/1980 | Maier | 106/90 |
| 4,247,649 | 1/1981 | Damiens | 521/55 |

*Primary Examiner*—Stephen J. Lechert, Jr.
*Assistant Examiner*—Howard J. Locker
*Attorney, Agent, or Firm*—William L. Baker; John J. Wasatonic

[57] ABSTRACT

Fireproofing compositions for steel structural members are provided. The compositions comprise a hydratable cementitious binder, shredded polystyrene aggregate, an air entraining agent, and a fibrous material. On addition of water, the compositions form settable, sprayable slurries which can be pumped to the point of application. The slurries are capable of spray application to steel structural members and adhere to the member in the slurried state and after setting. Excellent fire and heat protection is provided to the member despite the organic nature of the polystyrene aggregate.

16 Claims, No Drawings

SPRAYABLE FIREPROOFING COMPOSITION

BACKGROUND OF THE INVENTION

In the course of erecting steel structures, a thick coating of inorganic material is commonly applied to the metallic structural elements to achieve a number of objectives including fire retardance, improved appearance and sound deadening. While several types of formulations have been applied for these purposes over the years by means of a variety of techniques, the most successful system so far consists in spraying onto the steel surfaces settable aqueous mixes composed essentially of calcined gypsum, a lightweight inorganic aggregate material such as exfoliated vermiculite, a mixture of fibrous materials such as a high wet bulking cellulose fiber and glass fiber, and an air entraining agent. A composition of this type is described by Bragg in U.S. Pat. Nos. 3,719,573 and 3,839,059, along with the most desirable application technique, i. e., pumping the aqueous mix and spraying it directly onto the steel in one layer.

In order to be suitable for such use, coating mixes, both in the wet and dry state, must possess a number of crucial properties. They must be able to hold the large quantity of water that renders them capable of being pumped easily and to great heights. Yet they must retain a consistency sufficient to prevent segregation or settling of ingredients and permit adequate "yield" or coverage of the steel surface at a given thickness. The coating mixes, furthermore, must obviously adhere to steel surfaces, both in the slurried state and in the dry state. Also, the mix must set without the undue expansion or shrinkage which could only result in the formation of cracks that would seriously deter from the insulative value of the dry coating.

As intimated earlier, this complex balance of properties has substantially been achieved heretobefore by gypsum-vermiculite mixes containing cellulosic fiber. However, vermiculite is a naturally occurring mineral which is subject to variation in quality, consistency, and uniformity. Moreover, since the vermiculite mineral must be expanded at very high temperatures prior to use, its cost is subject to unpredictable variations in energy cost.

Accordingly, there has been a need and motivation in the art to formulate new spray applied fireproofing compositions which satisfactorily employ aggregates other than vermiculite while providing the diverse mix of properties referred to above.

SUMMARY OF THE INVENTION

In accordance with this invention, it has been found that sprayable cementitious compositions containing shredded polystyrene as a lightweight aggregate can be prepared and utilized as spray applied fireproofing compositions for structural steel members. It has been found that these compositions can be prepared as pumpable, sprayable materials which maintain a uniform consistency, without segregation of the aggregate, throughout the pumping operation and after application to the steel. Upon spray application to the steel members, the slurries provide a high yield and display satisfactory adhesion in both the slurried and set state. The adhered compositions provide excellent fire and heat insulative protection to the steel despite the organic nature of the polystyrene aggregate. Under fire test conditions, the polystyrene aggregate displays advantageous performance in that it shrinks, melts, and, in effect, disappears out of the fireproofing composition matrix, leaving behind a uniform distribution of cavities which imparts a very low effective thermal conductivity to matrix. This, in turn, increases the effectiveness of the matrix as a barrier to heat transfer.

The present invention is accordingly directed to settable, sprayable fireproofing compositions, capable of adherence to steel structural members in the slurried and set state, comprising a hydatable cementitious binder, shredded polystyrene aggregate, an air entraining agent, and a fiber component. The invention is further directed to fireproofed steel structural members coated with the fireproofing compositions of this invention.

DETAILED DESCRIPTION OF THE INVENTION

The aggregate used in the present compositions is a shredded polystyrene particle which can be produced by shredding loose expanded polystyrene beads or molded polystyrene beadboard. Extruded polystyrene can also be shredded to provide the aggregate material of this invention. A method and apparatus for shredding foamed polystyrene beads are disclosed in U.S. Pat. Nos. 3,627,211 and 3,686,068, the disclosure of which is expressly incorporated by reference herein. As disclosed in these patents, the shredded particles have irregularly shaped exterior surfaces, tears, and ragged edges. The shredding process opens a substantial number of the cells on the sruface of the foamed beads, thereby allowing penetration of the cementitious binder into the cellular structure and providing a more integral mix between the binder and the particle.

It is known to shred foam particles and mix the shredded particles with a granulate slurry wherein the granular material may comprise cement particles, sand, gypsum particles and the like. As disclosed, for example, in U.S. Pat. Nos. 3,630,820 and 4,100,242, if a sufficient number of the cells are penetrated by the slurry, the buoyancy of the particles becomes decreased such that the high viscosity of the slurry prevents the particles from rising.

In the pumpable compositions of this invention, it has been found that the decreased buoyancy of the particles is essential for satisfactory conveyance of the compositions through the pump mechanism and feed lines to the point of application. In contrast, non-shredded beads segregate within the slurry and the resultant localized concentration of beads can clog the pump, feed lines, and spray nozzle.

The shredded polystyrene particles are preferably employed in a weight concentration of about 1% to about 5%, based on the total weight of the composition before water addition. (Unless otherwise stated, all weight percentages given herein are similarly based). These concentrations are preferred for providing pumpable, non-segregating, uniform slurries which display desired levels of adhesion to steel substrates and provide excellent fire protection. In addition, the density of slurry compositions containing concentrations of shredded polystyrene within this range is sufficiently low after application to ensure that the coating stays in place before and after setting. Thus, "fall-off" of the applied composition due to inadequate adherence or mechanical and structural disturbance is minimized or eliminated.

The density of the shredded polystyrene is preferably in the range of about 0.2 to 0.6 pounds per cubic foot, more preferably about 0.3 to 0.5 pcf. Preferably, the particle size at its maximum dimension is less than ¼ inch.

Portland cement can be used as the cementitious binder of the invention. However, it is generally preferred to employ a gypsum binder due to its advantageous fireproofing performance. Although the gypsum can be used in relatively low amounts, e.g. as little as 60% by weight, it is generally preferred to employ at least 75% by weight, based on the total weight of the composition, and more preferably at least about 85% by weight.

The fibrous component of the present compositions can be either organic or inorganic. Preferably, the fibrous component is a mixture of a high wet bulking organic fiber, preferably cellulose fiber as described in U.S. Pat. Nos. 3,719,513 and 3,839,059, and an inorganic fiber which provides reinforcement, preferably glass fiber. The total amount of the fibrous component in the composition is preferably in the range of about 4% to 20% by weight. A particularly preferred composition comprises about 4% to 10% by weight of high wet bulking cellulosic fiber and about 0.1% to 2% by weight of glass fiber. It has been found that these particularly preferred fiber loadings, coupled with the preferred loading of about 1% to 5% by weight of shredded polystyrene particles, provides an optimum composition for easy pumping without segregation and for placement in high yield, i.e., placement over a relatively large area, per weight of the dry composition, at a given thickness of application. Yield is generally calculated by methods known in the art as board feet per dry weight of composition. The particularly preferred compositions are capable of providing a high yield of at least about 20 board feet per 45 pounds by weight of the dry composition. Generally, a yield in the range of about 25 to 35 board feet per 45 pounds dry weight is obtained.

The foaming agents or air entraining agents that can be used in the compositions of the invention are well known in the art. Such well known materials as sulfonated monoglycerides, sodium alkyl arylsulfonate, and sodium laurel sulfate can be used in appropriate quantities to provide a slurry of desired density and pumpability. Dry foaming agents can be incorporated into the dry composition before addition of water, while both dry and liquid agents can be added to the slurried composition. Preferred amounts of the air entraining agent are about 0.1% to 0.5% by weight. The combination of air entrainment and shredding of the polystyrene is especially advantageous for providing homogeneity to the slurry, i.e., preventing segregation of the aggregate, for the period of time necessary for pumping, spraying and setting of the slurry.

In certain instances it is also desirable to incorporate into the mix a water retaining agent which allows more water to be incorporated into the slurry, thereby increasing pumpability and yield, while retaining about the same level of adhesion to steel. A preferred water retaining agent is hydroxypropylmethylcellulose.

The dry compositions of this invention are converted to pumpable slurries by addition of water. Generally, the water is added to the dry mix at the job site shortly before being pumped to the point of application. A water:cementitious binder ratio of about 1.5:1 to 2.5:1 is generally employed to provide a pumpable mixture of desired consistency and adhesiveness. Generally, a useful range of slurry density, which affords easy pumping, is about 35 pcf to 55 pcf.

EXAMPLE 1

A gypsum-based composition of the invention was prepared by dry mixing the following ingredients:

| Ingredients | % By Weight |
| --- | --- |
| Gypsum | 88.6 |
| Shredded expanded polystyrene (.375 pcf) | 2.7 |
| Cellulose fiber | 8.0 |
| Glass fiber | 0.5 |
| Air entraining agent | 0.2 |

The dry composition was mixed with water at a water:gypsum ratio of 2.0 and pumped to a spray application nozzle at a rate of 17.7 board feet/minute using a Thomsen A375 pump at a pressure of 75 psi. The pumped slurry was applied to a steel substrate in a yield of 32.7 board feet per 45 pounds of the dry composition. The applied slurry displayed excellent adhesion to the steel in the wet state and after setting. The set composition functioned effectively as a fire and heat insulative coating in a fire test environment.

What is claimed is:

1. A dry composition comprising a hydratable cementitious binder, shredded polystyrene aggregate, an air entraining agent, and a fibrous component, said composition providing, on the addition of water, a settable slurry which is capable of spray application to a steel structural member and which, after spray application, is adherent to the member in the slurried state and after setting, said slurry, after setting, forming a fire and heat protective adherent coating on the member.

2. A composition of claim 1 wherein said shredded polystyrene aggregate is shredded expanded polystyrene beads, shredded polystyrene beadboard, or shredded extruded polystyrene.

3. A composition of claim 2 wherein said shredded polystyrene has a density in the range of about 0.2 to 0.6 pcf.

4. A composition of claim 2 comprising about 1% to 5% by weight of said shredded polystyrene.

5. A composition of claim 1 wherein said fibrous component comprises an organic fibrous material and an inorganic fibrous material.

6. A composition of claim 1 wherein said fibrous component comprises a high wet bulking organic fiber.

7. A composition of claim 6 wherein said organic fiber is cellulose.

8. A composition of claim 4 comprising about 4% to 10% by weight of high wet bulking cellulose fiber and about 0.1% to 2% by weight of glass fiber.

9. A composition of claim 1 further comprising a water retaining agent.

10. A composition of claim 9 wherein said water retaining agent is hydroxypropylmethylcellulose.

11. A slurry formed upon the addition of water to the composition of claim 1, said slurry having a density in the range of about 35 pcf to 55 pcf.

12. A slurry of claim 11 providing, after spray application, an in place yield of at least about 20 board feet per 45 pounds of said dry composition.

13. A fireproofed steel structural member comprising a steel structural member coated with a slurry of the composition of claim 1.

14. A fireproofed steel structural member comprising a steel structural member coated with the slurry of claim 12.

15. A composition of claim 1 wherein said fibrous component comprises an inorganic fibrous material.

16. A composition of claim 15 wherein said inogranic fibrous material comprises glass fiber.

* * * * *